Nov. 10, 1925.

S. CODY

EDUCATIONAL DEVICE

Filed Dec. 12, 1922

Fig. 1.

Individual Study Assignment Blank

| Write exercise (words for spelling) in this column before study (teacher's dictation) | Check Errors | Rewrite erroneous matter in correct form for study | Write material in Col. B from dictation on seperate sheets and record errors progressively in Cols. 3, 4, 5, etc till all are eliminated |
|---|---|---|---|
| A | | B | 2 3 4 5 6 7 8 9 10 11 |
| 1 Calm | | 1 | |
| 2 Conon | ✓ | 2 Canyon | |
| 3 Carried | | 3 | |
| 4 correct | | 4 | |
| 5 Casheer | ✓ | 5 Cashier | |
| 6 Catcher | | 6 | |
| 7 Caught | | 7 | |
| 8 Ceder | ✓ | 8 Cedar | |
| 9 Cellar door | | 9 | |
| 10 Character | | 10 | |
| 11 Chief | | 11 | |
| 12 Christian | | 12 | |
| 13 Cigarette | | 13 | |
| 14 circle | | 14 | |
| 15 clime (ascent) | ✓ | 15 climb | |
| 16 | | 16 | |
| 17 | | 17 | |
| 18 | | 18 | |
| 19 | | 19 | |
| 20 | | 20 | |
| 21 | | 21 | |
| 22 | | 22 | |
| 23 | | 23 | |
| 24 | | 24 | |
| 25 | | 25 | |
| 26 | | 26 | |
| 27 | | 27 | |
| 28 | | 28 | |
| 29 | | 29 | |
| 30 | | 30 | |

Fig. 2.

| As a test before study, cross out the wrong form when two or more are given in parentheses | Check Errors | Write below the correct word when an error is indicated by check in Col. 1 | Compose original sentence covering principles on which errors were made and record in Cols. 2, 3, etc errors still made on test till each principle is fully mastered |
|---|---|---|---|
| A | 1 | B | 2 3 4 5 6 7 8 9 |
| 1 (Its-It's) a fine day | ✓ | it's | |
| 2 He (don't-doesn't) like it | | | |
| 3 Mary has (drunk-drank) the milk | ✓ | drank | |
| 4 Already he (did-has done) it | | | |

Inventor
S. Cody

By
T. K. Bryant
Attorney

Nov. 10, 1925. 1,561,447
S. CODY
EDUCATIONAL DEVICE
Filed Dec. 12, 1922   2 Sheets-Sheet 2

FIG. 3.

Individual Study Assignment Blank

Study only the words checked in Col. 1 as having been missed on the test before study. Check in Col. 2 such of these words as are still missed on a second test (oral or written), and continue the process in Cols. 3, 4, etc., till all words checked in Col. 1 are fully mastered.

| B | 1 | 2 | 3 | 4 | 5 | 6 | 7 | 8 |
|---|---|---|---|---|---|---|---|---|
| 1 calm | | | | | | | | |
| 2 canyon | ✓ | | | | | | | |
| 3 carried | | | | | | | | |
| 4 corriage | | | | | | | | |
| 5 carrot | | | | | | | | |
| 6 cashier | ✓ | ✓ | ✓ | | | | | |
| 7 catcher | | | | | | | | |
| 8 caught | | | | | | | | |
| 9 cedar | ✓ | ✓ | ✓ | ✓ | | | | |
| 10 cellar door | | | | | | | | |
| 11 character | | | | | | | | |
| 12 chief | | | | | | | | |
| 13 Christian | | | | | | | | |
| 14 cigarette | | | | | | | | |
| 15 circle | | | | | | | | |
| 16 climb (ascend) | ✓ | | | | | | | |

FIG. 4.

Write exercise here before study (Correct form underneath)

...ment Blank
...d in Col. 1 as having been
...study. Check in Col. 2
...still missed on a
...w), and continue the
...till all words checked
...tered

| E | 1 | 2 | 3 | 4 | 5 | 6 | 7 | 8 |
|---|---|---|---|---|---|---|---|---|
| 1 calm | | | | | | | | |
| 2 canon | ✓ | | | | | | | |
| 3 carried | | | | | | | | |
| 4 corriage | | | | | | | | |
| 5 carrot | | | | | | | | |
| 6 casheer | ✓ | ✓ | ✓ | | | | | |
| 7 catcher | | | | | | | | |
| 8 caught | | | | | | | | |
| 9 ceder | ✓ | ✓ | ✓ | ✓ | | | | |
| 10 cellar door | | | | | | | | |
| 11 character | | | | | | | | |
| 12 chief | | | | | | | | |
| 13 Christian | | | | | | | | |
| 14 cigorette | | | | | | | | |
| 15 circle | | | | | | | | |
| 16 clime | ✓ | | | | | | | |

Inventor
S. Cody
By T. K. Bryant
Attorney.

Patented Nov. 10, 1925.

1,561,447

UNITED STATES PATENT OFFICE.

SHERWIN CODY, OF TOMPKINSVILLE, NEW YORK.

EDUCATIONAL DEVICE.

Application filed December 12, 1922. Serial No. 606,508.

*To all whom it may concern:*

Be it known that I, SHERWIN CODY, a citizen of the United States of America, residing at Tompkinsville, Staten Island, in the county of Richmond and State of New York, have invented certain new and useful Improvements in Educational Devices, of which the following is a specification.

In the art of education, more particularly in classroom instruction and study where one teacher is responsible for ten to fifty or more pupils in a group, methods commonly used result in what may be termed "averaged instruction," that is, in instruction suited to the average needs of the various members of the class, though if there were teachers enough and time enough, the ideal would be individual instruction for each pupil.

My invention is intended to provide a new record sheet by means of which each pupil may see at a glance what points he had right on each test exercise and what points he had wrong, and so receive as an assignment for study merely the points on which he was wrong as shown by a preliminary test given before study, as well as on tests after study, so that he may concentrate his attention exclusively on his weak points, progressively eliminating study of those he has mastered, until every point is mastered to the 100% point. This system is particularly applicable to such subjects as spelling, grammar, punctuation, etc. which pupils have largely mastered already, but on which most or all members of a class group have some weaknesses which need concentrated attention of a strictly individual kind.

For example, suppose the spelling of a list of twenty words is assigned to a class group as an exercise. Probably every member of the class will know how to spell some of these words even before any study whatever, and many will know how to spell all but two or three words. Yet all members are asked to study all words. The result is, first a serious waste of time in studying that which is known already, and the few words that do need concentrated attention fail to get it because of the time wasted on those that do not need it. But there is a still further danger, namely that the conscious study of words already spelled correctly unconsciously will result in confusion and the actual learning of misspelling. When a pupil is asked to study the spelling of any word he feels that there must be some reason for it. Since the only thing he can learn about that word is to spell it incorrectly, this is what, in his confusion, he too often actually does do.

By use of my device, pupils in a class group would be asked to write all words from dictation before study in a special blank column provided for the purpose. The spelling of the words would then be checked by the teacher, or by the pupil himself as the teacher dictated the correct spelling, or by comparison with a key list, and errors would be checked in a special adjoining column provided for the purpose. In another adjoining column the words misspelled might be written correctly by the pupil, or the checkmarks might be found to come automatically opposite the words in a key list where the correct spelling would be found printed. In either case the pupil receives an assignment for study consisting exclusively of words on which he has shown weakness before study. In other blank checking columns may be recorded the results of subsequent individual tests. For example, the pupils in a class group may be divided into pairs, and each pupil in a pair will test his fellow pupil on the words checked in that pupil's book as his individual assignment, and in turn the second pupil would test the first on his individual list of misspelled words. Thus, by means of a regular system, carried out according to specific instructions, each pupil would receive automatically his individual assignment for study, and would be kept individually on those points until he had eliminated all errors. The common method of averaged instruction would be transformed into strictly individual instruction, even when one teacher must handle fifty or more pupils at one time. Moreover, every pupil is provided with a permanent record of every mistake he has ever made on any lesson, he sees how many times he has made the same mistake, and at future times he may review precisely the points on which he has previously had difficulty, without having to go over all the thousands of points of complete assignments in order to sift out the few on which he has had particular trouble. The lack of a permanent convenient record of every error made on every point of every lesson has been a serious handicap to the success of all our school instruction.

With the above general objects in view and others that will appear as the nature of the invention is better understood, the same consists of the novel form, combination and arrangement of parts hereinafter more fully described, shown in the accompanying drawings and claimed.

In the drawings, wherein like reference characters designate corresponding parts throughout the several views, Figure 1 is a face view of an individual study assignment sheet constructed in accordance with the present invention for use in connection with the teaching of spelling, Figure 2 is a face view of a similar sheet wherein the same principle is involved, with a form adapted to the teaching of grammar, Figure 3 is a face view of a modified form of the sheet which includes a folder leaf that may be moved to an extended position so as to show a column having the correct spelling of the words printed therein opposite the areas in which errors had been checked in the spelling of the same words when written from dictation in the blank column of the part of the sheet folded over, and Figure 4 is a face view of the sheet shown in Figure 3 with the leaf moved to its folded position so as to show the blank column in which the words would be written while the correct spelling in the key was concealed underneath.

Briefly described, the above objects are accomplished by combining into a balanced system three procedures that have always been common in the class room, but for some reason or other have never before been combined systematically or provided with an adequate method of recording. The invention consists in combining these three elements on a leaf or sheet which in multiplicity may be bound up into a book, of which a copy will be placed in the hands of every pupil, and which, when used according to directions printed on the leaf or in association therewith, will become his individual record of work and progressive assignment of material for study.

The three elements of procedure are:

1. A space where a column of exercises may be written on a sheet of paper in orderly form at the dictation or direction of a teacher with a view to having points of error checked and so a portion selected for individual study;

2. A space where the correct form of work which has been written erroneously may be set down as the material for actual study, either rewritten in corrected form in a blank space provided for the purpose, or found in correct printed form as a key opposite the spaces in which errors were checked when the entire material was written as a test; and 3. Adjoining these exercise spaces a number of columns progressively designated and divided into areas directly opposite the various items of the exercise, in which errors may be checked according to directions associated with them, and including directions to the effect that study is to be concentrated exclusively on the items checked as subject to error, and when the pupil is tested on these items that errors still made should be checked in the next column, which checkings become a fresh assignment for study, and so on progressively until the whole original assignment may be handled by the pupil without error. It is to be understood that the progressive tests may be written on separate sheets of paper, or may be made orally, but in each case the results should be progressively recorded in the proper columns according to the directions. In practice, the pupils are paired off and one tests another on his individual weak points.

Referring more in detail to the accompanying drawings, and particularly to Figure 1, the device illustrated embodies a sheet or leaf of paper suitable to have an exercise written upon it with either pen or pencil. This may be titled at the top "Individual study assignment blank." On this sheet is printed a blank form separating the space into three essential areas. Beginning at the lefthand side, there is a blank column A indicated by the reference numeral 1, suited to have a series of exercises written in it. At the top of it are directions 2 or instructions to the effect that the exercise material shall be written in that column before study. Adjoining it on the right is a narrow column 3 headed with the figure 1 and the words "Check errors," in which every erroneous item of the exercise written in column A shall be checked either by the teacher or by the pupil at the direction or dictation of the teacher. At the right of this narrow column is a wider column 4 designated B in which all erroneous exercises discovered in column A are to be rewritten correctly, according to directions 5 which appear at the top of this column. Still further to the right are additional narrow checking columns 6 designated at the top 2, 3, 4, etc., similar to the checking column 1 with instructions 7 at the top of them to the effect that the exercises found in column B as the individual study assignment shall be tested (either orally or by writing on a separate sheet of paper) and errors still made checked in column headed 2 as a fresh assignment for study, while on test of this assignment errors still made shall be checked in column headed 3, and so on till all errors have been progressively eliminated.

Observe that it is convenient though not essential that horizontal lines across these columns, designated in the illustration by reference number 8, should segregate areas right across the page that shall be suited to carry each exercise through all of the various steps if necessary. These may be conveniently numbered from top to bottom 1, 2, 3, etc., at the lefthand side of column A, and for convenience the corresponding numbers may be found in column B.

In Figure 1 we see a list of words 9 written in column A. In check column 1 we see check marks 10 against four of these words to indicate that they are misspelled as written in column A. In column B these four words are rewritten as at 11 with correct spelling as the individual assignment for study. We see checkmarks 12 against one of the words in checking columns 2 and 3, and against one of the words there are checkmarks in columns 2, 3 and 4. The checks in each of these columns constitute fresh assignments for study of these words until on the third assignment one of them is mastered and on the fourth assignment the other also.

A variation of the above described sheet is shown in Fig. 2. In column A of this form of the invention the exercises are printed, and the directions are varied to call for crossing out the wrong form when two or more are given in parentheses. Errors are to be checked in checking column headed 1, as in Figure 1, and the correct form written in column B, according to directions 5 at the head of this column. This exercise is upon the grammatical use of these forms in sentences similar to the sentences in column A. In the space above checking columns 2, 3, 4, etc., there are therefore directions 7 asking pupils to compose original sentences in which the forms written in column B are correctly used, and to check errors in columns 2, 3, 4, etc., until all forms can be used freely without error, each exercise being eliminated as an assignment for study as it is found to be mastered. Of course the exercise sentences called for in the instructions would be written on separate sheets of paper or would be composed orally.

Another form of the invention is shown in Figures 3 and 4, wherein a folded sheet is employed. While this form of sheet is adaptable for various subjects of study, the improved art of teaching spelling is illustrated in connection therewith. Figure 3 shows the face of the sheet unfolded, in which the space at the left where exercise column A appears in Figure 1 is blank and column B shows the exercise 13 printed in correct form as a key. Checking column 1 appears at the righthand side of column B adjoining columns 2 etc. Figure 4 shows the same sheet with the portion 14 at the left folded over on the space occupied by column B. This folded part provides the space for column A, with directions to write the exercises below as in the previous illustration. The exercise spaces 15 numbered vertically 1, 2, 3, 4, 5, etc., correspond accurately to the spaces shown in column B in Figure 3, in which the correct spelling of the words is printed as a key, while the checking spaces 16 in checking columns 1, 2, 3, 4, etc. correspond accurately to the exercise spaces in both columns A and B. When column A is folded over on column B as shown in Figure 4, this flyleaf conceals the correct spelling of the words in column B and pupils write their own idea of the correct spelling in the blank spaces of column A as the teacher dictates to them the list of words in column B in the order in which they there appear. Errors are checked in checking column 1, as described in connection with Figures 1 and 2, and when the folded portion of the leaf is lifted the pupil finds that the checkmarks designate his individual assignment for study according to directions printed at the top of this portion of the sheet as shown in Figure 3. Words checked in column 1 are tested and errors still made are checked in column 2 as a fresh assignment for study, and so on in the successive columns until all errors are eliminated.

It may be stated that the directions need not necessarily be printed at the top of the page, but may appear at the bottom, or one side, or on a separate sheet associated with the blanks.

This application presents a novel device in the union of the various elements on a single recording sheet, by which the common educational practice of averaged instruction for a class group is elevated to the level of automatic individual instruction on a practical working basis through different forms of the invention as here set forth, so that one teacher can carry on the individual instruction of ten to fifty or more pupils simultaneously in a class group. It is to be noted that this application continues and presents in part the subject-matter of the originally allowed application Serial No. 118,010 which referred only to spelling, and also applications Serial Nos. 371,850 and 371,851, in which it was intended to extend the principles of original application Serial No. 118,010 to other subjects than spelling and show improvements and advantages thereover. A form of this invention suited to instruction by correspondence, applied for after the original application, is disclosed in Patent No. 1,281,295, issued Oct. 15, 1918.

What I claim as new is:—

1. In a teaching device, a sheet employed as an individual assignment for study having areas defined thereon which are adapted to receive a school exercise with a progressive record of tests upon the exercise, comprising an area in which an exercise may be written by a pupil and corresponding areas in progressively designated columns in which errors made on successive tests upon the original exercise may be recorded, and having associated therewith instructions for concentrating study upon the subject of errors checked in the successive columns after each test as so many successive assignments for study.

2. In a teaching device, a sheet employed as an individual assignment for study having areas defined thereon which are adapted to receive a school exercise with a progressive record of tests upon the exercise, comprising an area in which an exercise may be written by a pupil as a test before study, an adjacent column in which errors upon this test may be checked, another adjacent space in which may be written the correct form of any item upon which error was made in the preliminary test, as an individual assignment for study, and a plurality of progressively designated checking columns in which may be recorded errors made in successive tests upon this individual assignment, and having associated therewith instructions for the use of these various areas according to the purpose for which they are intended.

3. In a teaching device, a sheet employed as an individual assignment for study having areas defined thereon which are adapted to receive a school exercise with a progressive record of tests upon the exercise, comprising horizontally alined areas for respectively receiving from left to right, an exercise to be written by a pupil as a test before study, the correct form of the exercise upon which an error has been made in the previous test as an individual assignment for study, and the checking of errors made upon each test, the area receiving the checks comprising a plurality of progressively designated checking columns in which are recorded errors made in successive tests upon the individual preliminary assignment for study, and having associated therewith instructions for the use of these various areas according to the purpose for which they are intended.

4. An educational device for teaching spelling and progressively recording the results thereof, comprising a leaf adapted to have a column of words placed thereon, said leaf having a plurality of columns progressively numbered at the heads thereof, and containing instructions for successively checking a successively misspelled word in progressively numbered columns for the elimination for words for study upon which errors are no longer made.

5. An educational device for teaching spelling and progressively recording the results thereof consisting of a leaf adapted to have a column of words written thereon, said leaf having a plurality of columns progressively numbered at the heads thereof and containing instructions for checking successively misspelled words as an individual assignment for study in the progressively numbered columns each column being numerically designated for each repetition of the exercise to the point of mastery.

6. An educational device for teaching a subject of study and progressively recording the results thereof comprising a sheet divided into upper and lower block portions, the lower block portion being divided into vertical columns, one of said vertical columns being progressively numbered at the head thereof with the space below provided with vertical rows of check receiving areas alined with said numbers, the upper block of the sheet containing instructions for checking in the progressively numbered rows errors made upon the original exercise and the other of the vertical columns having a caption designating the character of the exercise and having areas for receiving the exercise horizontally alined with the check receiving areas.

In testimony whereof I affix my signature.

SHERWIN CODY.